United States Patent
Azzaro et al.

(10) Patent No.: US 6,487,478 B1
(45) Date of Patent: Nov. 26, 2002

(54) ON-BOARD MONITOR FOR RAILROAD LOCOMOTIVE

(75) Inventors: Steven Hector Azzaro, Schenectady, NY (US); Thomas Shaginaw, Rexford, NY (US); Vinay Bhaskar Jammu, Niskayuna, NY (US); Thomas George Cook, Fairview, PA (US); Thomas Timothy Booth, Indialantic, FL (US)

(73) Assignee: General Electric Company, Schenectady, NY (US)

( * ) Notice: Subject to any disclaimer, the term of this patent is extended or adjusted under 35 U.S.C. 154(b) by 32 days.

(21) Appl. No.: 09/696,368

(22) Filed: Oct. 25, 2000

Related U.S. Application Data

(60) Provisional application No. 60/161,965, filed on Oct. 28, 1999.

(51) Int. Cl.$^7$ .............................................. G06F 19/00
(52) U.S. Cl. ............................. 701/24; 701/29; 701/31; 340/3.1
(58) Field of Search ............................. 701/19, 24, 25, 701/29, 30, 31, 35, 36; 246/122 R, 123; 340/3.1; 370/346

(56) References Cited

U.S. PATENT DOCUMENTS

| | | | |
|---|---|---|---|
| 4,517,468 A | 5/1985 | Kemper et al. | |
| 4,561,057 A | 12/1985 | Haley, Jr. et al. | |
| 4,827,438 A | 5/1989 | Nickles et al. | |
| 4,885,689 A | 12/1989 | Kane et al. | |
| 5,065,321 A | 11/1991 | Bezos et al. | |
| 5,185,700 A | 2/1993 | Bezos et al. | |
| RE35,590 E | 8/1997 | Bezos et al. | |
| 5,806,011 A | 9/1998 | Azzaro et al. | |
| 5,845,272 A | 12/1998 | Morjaria et al. | |
| 5,884,202 A * | 3/1999 | Arjomand | 701/29 |
| 5,961,567 A | 10/1999 | Azzaro et al. | |
| 6,264,950 B1 * | 6/2001 | Bessler et al. | 701/99 |

OTHER PUBLICATIONS

Fry, K.N., BSc; Diesel Locomotive Reliability Improvement By System Monitoring; British Rail Research, Railway Technical Centre, Derby; 1995; Proceedings of the Institute of Mechanical Engineers, vol. 209.

* cited by examiner

Primary Examiner—William A. Cuchlinski, Jr.
Assistant Examiner—Arthur D. Donnelly
(74) Attorney, Agent, or Firm—John L. DeAngelis, Jr.; Carl A. Rowold; Beusse Brownlee Bowdoin & Wolter, P.A.

(57) ABSTRACT

An on-board monitor for a railroad locomotive is disclosed. The on-board monitor interfaces with the controller subsystems of the locomotive to collect parametric performance data. The specific data to be collected and the collection intervals are defined at a remote service center and transmitted to the on-board monitor. The on-board monitor also includes the capability to collect additional data or collect data more frequently in response to the results of certain triggering events.

37 Claims, 2 Drawing Sheets

ON-BOARD MONITOR FOR RAILROAD LOCOMOTIVE

This application claims the benefit of U.S. Provisional Application No. 60/161965 filed on Oct. 28, 1999.

BACKGROUND OF THE INVENTION

The present invention is directed in general to monitoring performance and operational parameters and fault-related information on a railroad locomotive or other complex electromechanical system, and more specifically, to a method and apparatus for on-board monitoring of performance and fault-related parameters and transmission of the data collected to a monitoring and diagnostic site.

A railroad locomotive is one example of a complex electromechanical system comprised of several complex subsystems. Each of these subsystems is built from components which over time will fail. When a component does fail, it may be difficult to determine the cause of the failed component because the effects or problems that the failure has on the subsystem are often neither readily apparent in terms of their source nor are they typically unique.

The ability to automatically diagnose problems that have occurred or will occur in the locomotive subsystems has a positive impact on minimizing locomotive downtime. It is known that cost efficient operation of a railroad requires minimization of line-of-road failures and locomotive down time. Failure of a major locomotive subsystem can cause serious damage, costly repairs, and significant operational delays. A locomotive break-down while in service is an especially costly event, requiring the dispatch of a replacement locomotive to pull the train consist and possibly rendering a track segment out of service until the train is moved. As a result, the health of the locomotive engine and its constituent subsystems is of significant concern.

Previous attempts to diagnose problems once they have occurred on a locomotive usually involve performing inspections by experienced personnel who have in-depth individual training and experience in working with locomotives. Typically, these experienced individuals use available information that has been recorded in a log. Looking through the log, they use their accumulated experience and training in mapping incidents occurring in locomotive systems to problems that may be causing the incidents. If the incident-problem scenario is simple, then this approach works fairly well. However, if the incident-problem scenario is complex, then it is very difficult to diagnose and correct any failures associated with the incidents.

Currently, computer-based systems are being used to automatically diagnose problems in a locomotive in order to overcome some of the disadvantages associated with relying completely on experienced personnel. Typically, a computer-based system utilizes a mapping between the observed symptoms of the failures and the equipment problems using techniques such as table look ups, a symptom-problem matrices, and production rules.

There is also no automatic or systematic mechanism for the identification of incipient locomotive problems. Instead, conventionally, the railroads have relied on regular inspections and the observation of performance anomalies by the locomotive operator. Some cursory inspection processes are accomplished while the locomotive is in service; more thorough inspections require the locomotive to be taken out of service for several days. In any case, locomotive down time, whether for inspection or repair, represents a significant railroad cost. The avoidance of these costs by accurate fault diagnosis and prediction of potential failures represents an important cost saving opportunity for the railroads.

As a further means to reduce locomotive downtime, there has been a focus on the engineering design process with an objective of increasing the mean time between failures for locomotive subsystems and components. While this is certainly a commendable objective, it remains for the railroads to continue their cost containment goals through the collection and monitoring of real time performance data and fault related information directly from the locomotive, and the implementation of repairs before the problem requires significant down time.

BRIEF SUMMARY OF THE INVENTION

The above-mentioned difficulties associated with locomotive operations can be ameliorated by the present invention, which relates to a novel and unobvious apparatus and method for measuring performance and fault-related parameters of the locomotive during operation. Monitoring the locomotive performance can provide timely and important indications of expected and immediate failures. With timely and continuous access to locomotive performance data, it is possible to predict and/or prevent untimely failures.

With recent advances in telecommunications technologies, it is now possible to collect information from a moving locomotive and transfer it to a fixed monitoring and diagnostic service center. With today's advances in computing technology, the large amount of data collected from a fleet of locomotives can be properly aggregated and analyzed. The railroad can now better understand the operational and performance characteristics of its individual locomotives and the entire locomotive fleet. Analysis of this performance data can allow the railroad to advantageously predict and thereby avoid line-of-road failures.

The present invention provides for the collection, aggregation, and communication of locomotive performance and fault-related data from an operational locomotive. Generally, anomalous or fault conditions will be brought to the attention of the locomotive operator directly by the control system, but the control systems generally lack the necessary hardware and software elements to self-diagnose the fault. After collection, the performance data is communicated to a remote monitoring and diagnostic site, where data analysis tools operate on the data to identify the source of potential or actual faults. The analysis tools may employ case-based or artificial intelligence strategies. In addition to computer-based analysis, human operators who are experts in locomotive operation and maintenance analyze the data received. Historical data and patterns of anomalous behavior can be important clues to an accurate diagnosis and repair recommendation. The lessons learned from failure modes in a single locomotive can then be applied to other locomotives of the class or to the entire fleet so that the necessary preventative maintenance can be performed. When the data analysis process identifies incipient problems, certain performance aspects of the locomotive can be derated to avoid further system degradation, and further limit violation of operating parameters.

BRIEF DESCRIPTION OF THE DRAWINGS

The present invention can be more easily understood and the further advantages and uses thereof more readily apparent, when considered in view of the description of the preferred embodiments and the following figures in which.

DETAILED DESCRIPTION OF THE PREFERRED EMBODIMENTS

Figure 1:
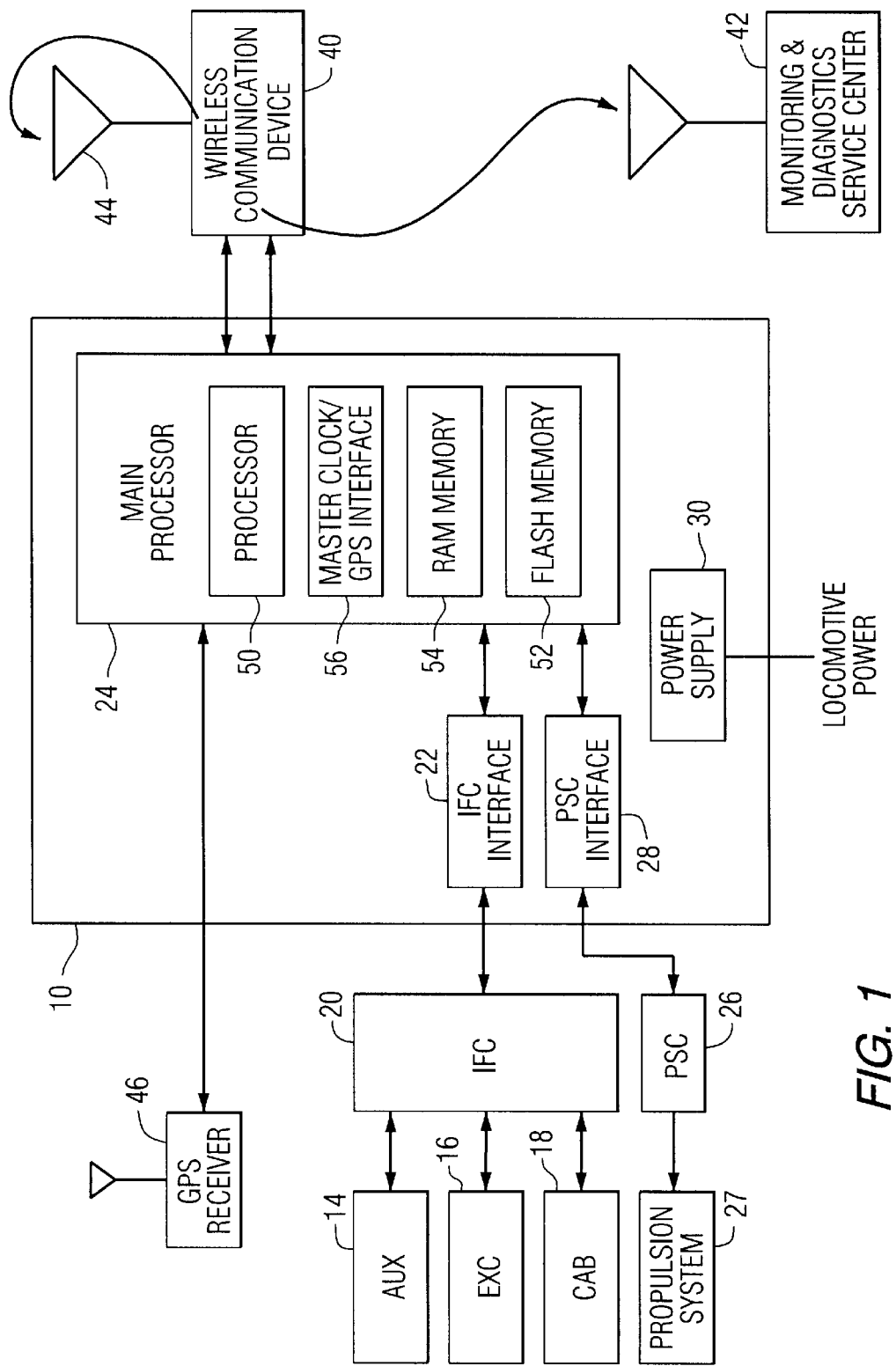
FIG. 1 is a block diagram of an on-board monitor constructed according to the teachings of the present invention.

Before describing in detail the particular on-board monitor in accordance with the present invention, it should be observed that the present invention resides primarily in a novel combination of processing steps and hardware related to an on-board monitor for a railroad locomotive. Accordingly, these processing steps and hardware components have been represented by conventional processes and elements in the drawings, showing only those specific details that are pertinent to the present invention, so as not to obscure the disclosure with structural details that will be readily apparent to those skilled in the art having the benefit of the description herein.

The on-board monitor of the present invention resides in a locomotive and serves as a platform to gather data from operational locomotive control systems. This data provides important locomotive performance and status information that can be analyzed to identify active faults, predict incipient failures and provide timely information about existing operating conditions. Once a failure has occurred, the data gathered by the on-board monitor of the present invention can also commanded from the monitoring and diagnostic center to collect additional information so that the locomotive experts can isolate the nature of the fault and develop the necessary repair recommendations.

The on-board monitor is a signal acquisition, conditioning, data processing and logging instrument that provides status information to a monitoring and diagnostic service center. As will be discussed further below, the on-board monitor also has the capability to initiate a call to the monitoring and diagnostic service center whenever an incipient failure or existing condition of significant severity is discovered. In the absence of such a severe problem, the locomotive status information is logged and periodically transferred to the monitoring and diagnostic service center via a wireless communications link.

Turning to the FIG. 1, there is shown an on-board monitor 10 constructed according to the teachings of the present invention. The on-board monitor 10 interfaces with several locomotive control systems that are employed by the locomotive operator to control the locomotive. The on-board monitor 10 is a passive device, i.e., it does not interfere with operation of the various locomotive systems and processes the collected data independent of these systems.

As is well known to those skilled in the art, within a locomotive, an auxiliary equipment controller 14, an excitation controller 16, and a cab controller 18 provide feedback signals to and are in turn controlled by an integrated function controller 20. The integrated function controller 20 is bidirectionally connected to an integrated function controller interface 22, which in turn is bidirectionally connected to a main processor 24 of the on-board monitor 10. The locomotive also includes a propulsion system controller 26, which interfaces bidirectionally with the main processor 24 through a propulsion system controller interface 28. The propulsion system controller 26 controls the performance of the locomotive propulsion system, represented by a single block in the FIG. 1 and bearing reference character 27.

The on-board monitor 10 includes a power supply 30 that derives its power from the locomotive power bus. In one embodiment, the on-board monitor 10 operates on a nominal voltage of 74 VDC. When the voltage drops below 25 VDC, the on-board monitor 10 executes a safe power down process, causing all open files and ongoing tasks to close in an orderly fashion. After these operations are complete, the on-board monitor 10 powers down. The time required to perform this power-down task is dependent on the number and type of tasks that are open when the power drops below the threshold value.

The auxiliary equipment controller 14, the excitation controller 16, the cab controller 18 and the propulsion system controller 26 interface with transducers (not shown in the Figure) located within the respective controlled subsystems of the locomotive and in turn control these subsystems. These transducers measure, for instance, temperature, pressure, voltage, current, speed, and time intervals between specific events, and provide this information to the respective controller so that the locomotive can be properly operated, either by automatic or manual adjustments to the controlled systems.

The main processor 24 of the on-board monitor 10 has two interfaces with a wireless communications device 40. The first interface with the wireless communication device 40 provides a communications link to a monitoring and diagnostic service center 42 via an antenna 44. The communications link carries data, commands, and configuration information between the monitoring and diagnostic service center 42 and the on-board monitor 10. The second interface with the wireless communication device 40 provides the main processor 24 with device status information concerning the wireless communication device 40 and the antenna 44, and further provides signal strength information as related to an active or proposed communications link with the monitoring and diagnostic service center. The on-board monitor 10, through the main processor 24, also communications with the global positioning satellite system (GPS), through a GPS receiver 46. The GPS system provides locomotive location and time of day information.

The main processor 24 includes a processor 50, a flash memory 52, and a RAM memory 54. These elements are connected in the conventional manner as is well known to those in the art, to form a computer system. The main processor 24 also includes a master clock/GPS interface 56, which keeps clock time for the on-board monitor 10, in response to time signals received by the GPS receiver 46. Flash memory is non-volatile and can therefore retain data when power is removed from the on-board monitor 10.

The main processor 24 and its constituent elements provide the primary functionality for the on-board monitor 10. This functionality includes employing various parametric sensors to gather data from the integrated function controller 20 and the propulsion system controller 26, processing and storing that data, and finally downloading the data to the monitoring and diagnostic service center 42 either automatically or upon receipt of instructions therefrom. The data collected according to the teachings of the present invention can include any parameters indicative of operation of the railroad locomotive. For example, voltages, currents, temperatures, pressures, fluid levels, fluid flow rates, weights, forces, relative time and time intervals and the position of operator selectable devices. In short, any measurable parameters indicative of system or subsystem performance can be collected by the on-board monitor 10. In the absence of specific download commands, the information collected by the on-board monitor 10 is downloaded to the monitoring and diagnostic service center on a regular and periodic basis. Additionally, in response to certain parametric or fault-related data parameters and conditions that may require immediate attention, the on-board monitor 10 automatically contacts the monitoring and diagnostic service center 42 for transferring the relevant data or for receiving instructions (for example, commands to collect additional data or the same data more frequently). Alternatively, the on-board monitor 10 may contact the monitoring and diagnostic service center 42 (e.g., send a flag) and request that the center immediately call the locomotive (specifically the on-board monitor 10) for the purpose of downloading the relevant data from the on-board monitor 10 to the monitoring and diagnostic service center 42. In response to the flag, the monitoring and diagnostic service centers transmit an acknowledgment signal to the on-board monitor 10, and the on-board monitor 10 then sends the relevant data.

In one embodiment, the on-board monitor 10 synchronizes the current time with the time provided by the global positioning system (via the GPS receiver 46) every five seconds. Internal time is kept in the master clock/GPS interface 56. In the event the on-board monitor 10 cannot synchronize with the global positioning system at the required interval (for example, because the GPS receiver 46 cannot close a link with a GPS satellite), the master clock/GPS interface 56 continues a zero-based time count until the next synchronization occurs. Also, in the event that the GPS time is not available when the on-board monitor 10 is powered-up, the main processor 24 establishes a zero-based time. The current time, as stored in the master clock/GPS interface 56 is used to time stamp the data and performance parameters collected by the on-board monitor 10.

The on-board monitor 10 uses configurable software files to control various aspects of its operation, including identification of the information to be gathered and the manner of storing, processing and uploading that information. Generally, these files include various startup and configuration files that are exchanged between the on-board monitor 10 and the monitoring and diagnostic service center 42. The data within these files performs several functions including, ensuring that the locomotive road number in which the on-board monitor 10 is installed matches the configuration at the monitoring and diagnostic service center 42. In this way, information downloaded from a specific on-board monitor 10 will be properly identified as providing performance information for a specific locomotive road number. Additional information included within these configuration files is the software versions of the various software programs running on the on-board monitor 10, the integrated function controller 20 and the propulsion system controller 26. Additionally, the configuration files identify the parametric operational information to be collected and the statistical analysis to be conducted on the retrieved data. Further attributes of the configuration files will be discussed herein below as related to the data collection process.

The parametric data file, which is a file periodically downloaded by the on-board monitor 10 to the monitoring and diagnostic service center 42, contains various locomotive performance statistics and operational parameters collected from the integrated function controller 20 and the propulsion system controller 26. In one embodiment, these performance statistics include: total locomotive operating time, time spent at idle, time spent at each operating level (throttle notch position or dynamic brake step position), and horsepower output. Parametric data collected and transmitted to the monitoring and diagnostic service center includes temperature, pressure, voltage, and current of the various systems and subsystems of the locomotive. All parametric data gathered is identified by the locomotive controller where it originates. Each parameter also has associated with it an identifier as to whether the value is to be converted to alternative units.

As discussed above, the collection and transmittal of parametric data is the primary function of the on-board monitor 10. This data file is downloaded by the on-board monitor 10 to the monitoring and diagnostic service center 42, where it is analyzed to detect active and incipient faults and used to generate repair recommendations.

The time interval between gathering these performance statistics is a configurable item, as defined in the configuration file for the specific parametric data. In one embodiment, the interval between data gathering is one hour. The monitoring and diagnostic service center 42 controls the rate at which the operational parameters are gathered by changing the time interval value in the upload start-up file.

The upload start-up file also defines certain fault conditions as determined by specified parametric data values or performance anomalies. An active fault log file and a reset fault log file of the on-board monitor 10 store information concerning the faults, and link this information to the geographical position of the locomotive at the onset of the fault, through the GPS receiver 46. Two files are required so that a record can be kept of the occurrence time and the reset time of the fault. The active fault log contains an identification of the specific fault, the time at which it occurred, the time the fault was reset, and certain locomotive operating conditions when the fault occurred. The reset fault log contains an identification of the fault, the time at which it occurred, and the time at which it was reset by the respective locomotive controller.

To create the active fault log, the integrated function controller 20 or the propulsion system controller interface 28 sends a message to the on-board monitor 10 whenever a fault occurs or is reset. Upon receipt, the on-board monitor 10 determines if the fault is a new one, in which case it gathers information including an identification of the fault, the GPS location upon onset, and locomotive performance data that is pertinent to the fault and the time of occurrence. This information is stored in the active fault log. If the event is a fault reset, the on-board monitor 10 gathers the fault identification information, reset time and the geographical location at reset, which is stored in the reset fault file. The on-board monitor 10 also tracks the number of active and reset faults, the most recent fault, and the time at which the most recent fault occurred.

As a further check, the on-board monitor 10 periodically requests fault status information from the integrated function controller 20 (and the propulsion system controller interface 28) to ensure that both units show the same number of generated faults. Typically, these check requests are made every hour and both active faults and reset faults are tracked. If the fault status numbers between the on-board monitor 10 and the integrated function controller 20 (or the propulsion system controller interface 28) differ, the on-board monitor 10 issues a fault data request to the integrated function controller 20 for information on the most recent fault. If status information still does not match, the on-board monitor 10 continues to scroll back through the list of faults until the stored fault and time of its occurrence match the most recently requested fault data, or until the scrolling process reaches the end of the list.

A critical faults file is a list uploaded from the monitoring and diagnostic service center 42 to the on-board monitor 10. The listed faults are those that are of sufficient severity to require the on-board monitor 10 to initiate a call back to the monitoring and diagnostic service center 42 whenever that fault occurs. Each fault on the list is associated with a timer value, which is configurable, and in one embodiment is one hour. When the on-board monitor 10 initiates a call to the monitoring and diagnostic service center 42 due to the occurrence of such a critical fault, the timer begins its count down process. Another call home for that particular fault cannot be initiated until the counter has expired. If another instantiation of that specific critical fault occurs while the timer is in its count down mode, the fault is entered into the fault log, but a call home is not initiated.

Whenever a new fault is identified by the on-board monitor 10, it is compared to a list of critical faults. If the new fault is a critical fault, the critical fault timer is checked to determine whether it is clear. If the timer is clear, the on-board monitor 10 initiates a call back to the monitoring and diagnostic service center 42.

The on-board monitor 10 also includes a signal strength file for plotting wireless communication satellite signal strength against the geographical location (as determined from the GPS receiver 46). The data in this file can later be analyzed to gain a better understanding of any situations where the on-board monitor 10 was unable to close a communications link with the monitoring and diagnostic service center 42 or where an active link dropped out of service. This file also includes the time the signal strength sample was gathered. The collection rate for the signal strength information is set in a configuration file for the signal strength file. Typically, this time is set at every ten minutes.

In addition to the predetermined data collection process discussed above, the on-board monitor 10 executes a special data collection process in response to certain performance anomalies as determined by certain anomaly trigger equations. The anomaly trigger equations are developed at the monitoring and diagnostic service center 42 and uploaded to the on-board monitor 10. These trigger equations define locomotive performance conditions (limits or ranges for relevant operational parameters) requiring unique data collection actions and also specify the specific data to be collected. As discussed above, the on-board monitor 10 periodically gathers parametric information from the integrated function controller 20 and the propulsion system controller 26. In addition to storing this information in the parametric data file, the gathered data is also examined to determine whether it satisfies any of the anomaly trigger equations. When a trigger condition is satisfied, additional performance data is gathered from the integrated function controller 20 and the propulsion system controller 26, as directed by the instructions for that anomaly trigger equation. This additional data gathering process continues as long as the trigger condition remains true. In response to an anomaly trigger, the on-board monitor 10 may be instructed, as set forth in the anomaly trigger information, to gather certain non-numeric data such as locomotive control settings or collect certain information that is not otherwise collected in the absence of the occurrence of the anomaly. The information gathered during an anomaly event may also be aggregated by calculating various statistical metrics for the data, as discussed below. The results of the statistical calculations are written to the anomaly statistics file, along with the GPS location information, the numeric and non-numeric data, and an identification of the associated anomaly trigger.

Whenever an anomaly equation trigger is satisfied, a trigger count down timer is also activated. That trigger equation is not permitted to trigger again until the timer has expired. The value set in the count down timer is defined in a configuration file for the anomaly trigger equation.

Each anomaly trigger equation has an associated configuration file that stores the following information: the trigger identification (an integer to identify each specific trigger equation), the length of time that the trigger equation must be true before data anomaly-driven collection begins, the number of data samples to be collected, the trigger count down time, a list of data parameters to be collected when the trigger is true, and a specific trigger equation. An exemplary trigger equation may be: (the engine RPM is greater than value one) AND (the locomotive speed is greater than value two) AND (the oil temperature is greater than value three) OR (the engine RPM is greater than value one) AND (the locomotive speed is greater than value two) AND (the water temperature is greater than value four). Using exemplary parametric values, mathematically this may be expressed as: (IFC1234>1040)+(IFC1235>45)+(IFC1236>170)| (IFC1234>1040)+(IFC1235>45)+(IFC1237>200).

When the on-board monitor 10 collects performance parameters in response to a satisfied trigger equation, the performance data is segregated into data blocks, with one data block for each monitored device. The following statistics are then calculated for each data block: the maximum and minimum values, the mean value of the data block, the standard deviation of the data block, and the median value of the data block. The median is defined as the middle value of n data points when arranged in increasing order and n is odd; and is defined as the mean of the two middle values of n data point when arranged in increasing order and n is even. The last two statistical values collected are the first value in the data block and the last value in the data block, when n data points are arranged in increasing order by time of collection.

The on-board monitor 10 also includes the ability to collect data based on customized data trigger equations. The custom data trigger equations can be individualized for a specific railroad or a specific locomotive. These equations can also be customized based on operating conditions of the locomotive. For example, during the winter season, custom data equations can be used to collect temperature statistics that may not be needed during the summer months. Any performance parameter that is accessible to the on-board monitor 10, through the integrated function controller 20 or the propulsion system controller 26, can be the subject of a custom data trigger equation. A call-home feature can also be associated with a custom trigger equation, allowing the on-board monitor 10 to call home when the data gathering for a custom data trigger equation has been completed or if a parameter is beyond a threshold limit. The monitoring and diagnostic service center 42 defines the number of samples to be gathered and the time interval over which the data collection occurs, for each custom data trigger equation, via the configuration file. Also, the call-home feature can be turned on or off on command from the monitoring and diagnostic service center 42.

Specifically, the customized data trigger equation file uploaded from the monitoring and diagnostic service center 42 to the on-board monitor 10 includes: an identification integer used to identify the customized trigger equation, the time duration during which the trigger equation must be true before data collection begins, the number of samples to be collected, the minimum amount of time that must elapse before this equation can again trigger, the list of performance parameters to be collected, any necessary unit conversions to be used on these parameters, and the specific customized trigger equation.

The raw data file of information collected by the on-board monitor 10 contains groups of raw monitored parametric data from the integrated function controller 20 and the propulsion system controller 26. The data is grouped by priority level (where the priority level defines the sample rate for gathering the data) and by the time at which the data was collected. Each file contains data of a single priority. Data is recovered from this file by requesting raw data for one or more specific parameters for a specific time frame. In one embodiment, there are seven priority designations for the raw data. Each parameter also has associated with it an identifier as to whether the value is to be converted to alternative units.

While it is possible to download the data files directly from the on-board monitor 10 to the monitoring and diagnostic service center 42, this is a time consuming and, therefore, expensive process, given the significant amount of data collected by the on-board monitor 10. Instead, the monitoring and diagnostic service center 42 is permitted to select data based on the time it is collected and specific performance parameters. Upon receiving this request from the monitoring and diagnostic service center 42, the on-board monitor 10 creates the necessary subfile and then transmits the subfile data back to the monitoring and diagnostic service center 42.

The on-board monitor 10 creates an operational log, providing a history of significant operational events occurring within the on-board monitor 10, and downloads this file to the monitoring and diagnostic service center 42. The operational log contains all information pertinent to the operation of the on-board monitor 10 including: start-up time, reset, power loss, GPS data acquisition events, calls received from and sent to the monitoring and diagnostic service center 42, and modem operational events. Prior to the creation of the operational log, specific instructions as to the content and format of the operational log are provided to the on-board monitor 10 by the monitoring and diagnostic service center 42.

As referred to above, several configuration files, which serve as instructions for various data collection and storage activities, are provided by the monitoring and diagnostic service center 42 to the on-board monitor 10. One such file, the global data parameters file, identifies all data that is to be gathered from the integrated function controller 20 and the propulsion system controller 26, the specific component to be monitored within the controllers, and whether units conversion of the data is to be performed by the on-board monitor 10 before storage or transmittal.

As discussed above, there are several instances when the on-board monitor 10 calls the monitoring and diagnostic service center 42. If the on-board monitor 10 encounters a busy signal when calling the monitoring and diagnostic service center 42, it automatically retries the call after a specified number of seconds have elapsed. Further, there is also a maximum number of call attempts, and when this number is reached, the call-home process for that specific fault is terminated and the data is downloaded on the next scheduled download.

Figure 2:
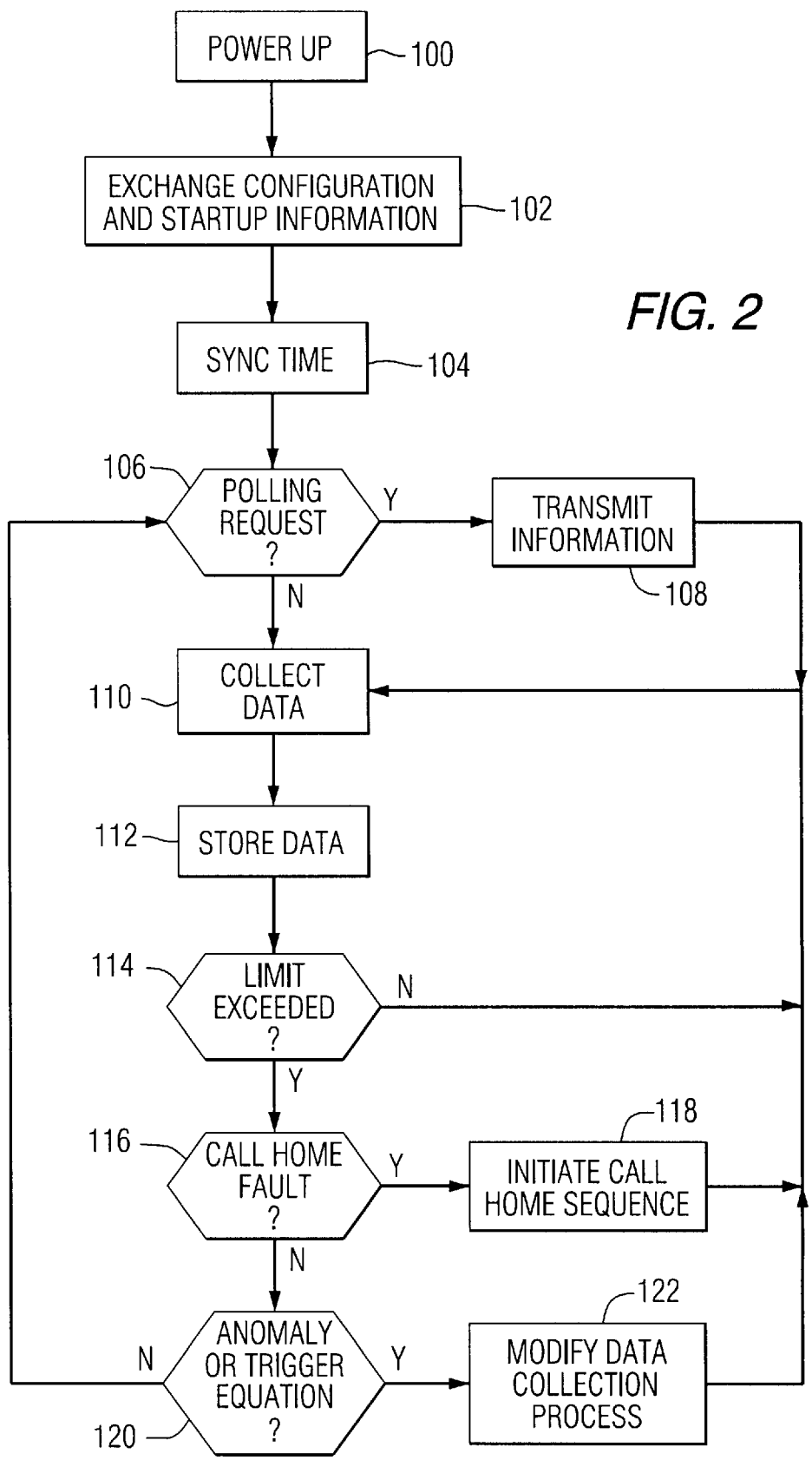
FIG. 2 is a process flow chart illustrating the process executed by the on-board monitor of FIG. 1.

FIG. 2 is a block diagram illustrating the process executed by the on-board monitor 10 of the present invention. The process begins at a step 100 when the on-board monitor 10 is powered up. Certain configuration and startup information is exchanged between the on-board monitor 10 and the monitoring and diagnostic service center 42 at a step 102. During this configuration/startup phase, the on-board monitor 10 determines the road number of the locomotive with which it is associated. The road number is transmitted to the monitoring and diagnostic service center 42 to ensure that future data received from this specific on-board monitor is associated with the correct locomotive. Additional information exchanged between the on-board monitor 10 and the monitoring and diagnostic service center 42 relates to the data to be collected from the locomotive, the frequency at which it is to be collected, the definition of certain anomaly and fault conditions (as discussed above) and the frequency at which data is to be transmitted back to the monitoring and diagnostic service center 42. The details of the configuration and startup sequence are disclosed and claimed in the commonly-owned United States Patent Application referred to above. At startup and during the course of the data collection process, the clock time of the on-board monitor 10 must be synchronized with the clock time at the monitoring and diagnostic service center 42. The process of synchronizing the time is indicated by a step 104 of the FIG. 2. In one embodiment, the synchronization process is carried out through the use of a global positioning system receiver at both the on-board monitor 10 and the remote monitoring and diagnostic service center 42.

At a step 106, a determination is made as to whether an active polling request is awaiting response at the on-board monitor 10. If there is a request awaiting action, the process moves to a step 108 where information is transmitted to the monitoring and diagnostic service center 42. It should be noted that the polling request from the monitoring and diagnostic service center 42 can be generated in response to a received polling flag or independent of any communications from the on-board monitor 10 to the monitoring and diagnostic service center 42. If there is not an active polling request, the process moves to a step 110 where data is collected in accordance with the teachings of the present invention. The data is stored as indicated at a step 112. At a decision step 114, the data is analyzed to determine whether any predetermined limits have been exceeded. If no limits have been exceeded, the data collection process of the step 110 continues. If limits have been exceeded, the process moves to a step 116 where it is determined whether the exceeded limits relate to a call home fault. If a call home fault is indicated, the process moves to a step 118 where the call home sequence is initiated. Details of the call home sequence are discussed above. If the result from the decision step 116 is negative, processing moves to a step 120 to determine whether the exceeded limits relate to an anomaly or trigger equation. As discussed above, when an anomaly or trigger equation is indicated, certain modifications are made to the data collection process in accordance with the teachings of the present invention. These modifications to the data collection process are indicated at a step 122, after which the process returns to the data collection step 110. In the event that a result from the step 120 is negative, processing moves then to the decision step 106 to check for the existence of a polling request. In addition to the process as indicated in FIG. 2, certain requests from the monitoring and diagnostic service center 42 are treated as interrupts to the FIG. 2 process and responded to by the on-board monitor 10 in due course. For example, if the locomotive experts at the monitoring and diagnostic service center 42 require additional parametric data for a certain analysis, a signal can be sent to the on-board monitor 10 for changing the data collection process. Alternatively, if the request for additional parametric data is not of immediate concern, the data collection process can be changed through commands and the configuration and/or startup files discussed above.

While the invention has been described with reference to a preferred embodiment, it will be understood by those skilled in the art that various changes may be made an equivalent elements may be substituted for elements thereof without the departing from the scope of the invention. In addition, modifications may be made to adapt a particular situation more material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. For use with a mobile asset comprising a plurality of systems, a method for monitoring the performance of the systems, comprising:
   (a) collecting performance data relative to at least one mobile asset system;
   (b) storing the performance data;
   (c) establishing at least one predetermined performance data range;
   (d) attempting to transmit the performance data to a remote site when one or more of the performance data ranges is exceeded; and
   (e) in the event the attempted transmission of step (d) was unsuccessful, or in the event none of the performance data ranges is exceeded, transmitting the performance data to the remote site periodically.

2. The method of claim 1 wherein the mobile asset is a railroad locomotive.

3. The method of claim 1 further comprising:
   (f) transmitting the performance data to the remote site in response to a polling signal transmitted from the remote site.

4. The method of claim 3 wherein the step (f) further comprises:
   (f1) activating a timer at the remote site;
   (f2) transmitting a polling signal to the vehicle upon expiration of the timer; and
   (f3) transmitting the performance data to the remote site in response to the polling signal.

5. The method of claim 1 further comprising:
   (f) activating a timer at the vehicle, wherein the step of periodically transmitting the performance data comprises transmitting the performance data when the timer expires.

6. The method of claim 1 including the additional steps of:
   (f) establishing one or more triggering conditions, wherein each said triggering condition has associated therewith an instruction; and
   (g) executing said instruction associated with a satisfied triggering event.

7. The method of claim 6 wherein the instruction includes collecting data at a specified frequency.

8. The method of claim 6 wherein the instruction includes collecting additional performance data from one or more of the mobile asset systems.

9. The method of claim 6 wherein the instruction includes transmitting the performance data to the remote site.

10. The method of claim 1 further comprising:
    determining the geographical location of the locomotive when the performance data is collected; and
    tagging the performance data with the geographical location.

11. The method of claim 10 wherein the step of determining the geographical location of the locomotive includes receiving location data from at least one global positioning satellite.

12. The method of claim 1 further comprising:
    determining the current time; and
    tagging the performance data with the current time.

13. The method of claim 12 wherein the step of determining the current time includes receiving time data from at least one global positioning satellite.

14. The method of claim 1 further comprising:
    receiving from the remote site instructions as to the specific items of performance data that are to be collected.

15. The method of claim 1 further comprising:
    receiving instructions from the remote site as to the periodicity of the data collecting step.

16. The method of claim 1 further comprising:
    receiving instructions from the remote site as to the time interval over which the performance data collecting step is to be executed.

17. The method of claim 1 further comprising
    calculating statistical measures of the performance data collected.

18. The method of claim 1 wherein a predetermined number of attempts are made to transmit the performance data to a remote site when one or more of the performance data limits are exceeded.

19. The method of claim 1 wherein the remote site is a monitoring and diagnostic service center.

20. For use with a mobile asset comprising a plurality of systems, a method for monitoring the performance of the systems, comprising:
    collecting data indicative of a fault in at least one mobile asset system;
    storing the fault data;
    establishing at least one predetermined fault data limit;
    attempting to transmit the fault data to a remote site when one or more of the fault data ranges is exceeded; and
    in the event the attempted transmission was unsuccessful or in the event none of the fault data range is exceeded, transmitting the fault data to the remote site periodically.

21. The method of claim 20 wherein the mobile asset is a railroad locomotive.

22. For use with a mobile asset comprising a plurality of systems, a method for monitoring the performance of the systems, comprising:
    (a) collecting performance data relative to at least one mobile asset system;
    (b) storing the performance data;
    (c) establishing at least one predetermined performance data range;
    (d) contacting a remote site when one or more of the performance data ranges is exceeded;
    (e) receiving a return call from the remote site;
    (f) transmitting the performance data to the remote site; and
    (g) in the event none of the performance data ranges are exceeded, transmitting the performance data to the remote site periodically.

23. The method of claim 22 wherein the mobile asset is a railroad locomotive.

24. For use with a mobile asset comprising a plurality of systems, a method for monitoring the performance of the systems, comprising:
    (a) collecting performance data relative to at least one mobile asset system;

(b) storing the performance data;

(c) establishing at least one predetermined performance data range;

(d) attempting to transmit a signal to a remote site when one or more of the performance data ranges is exceeded; and (e) in the event the attempted transmission of step (d) was unsuccessful, or in the event none of the performance data ranges are exceeded, transmitting the performance data to the remote site periodically.

25. The method of claim 24 wherein the step (d) further comprises:

(d1) attempting to transmit a flag to the remote site when one or more of the performance data ranges is exceeded;

(d2) in response to the flag, transmitting an acknowledgment signal from the remote site to the mobile asset; and (d3) in response to the acknowledgment signal, transmitting the performance data to the remote site.

26. The method of claim 24 wherein the step (d) further comprises:

(d1) attempting to transmit a flag to the remote site when one or more of the performance data limits is exceeded; and (d2) in response to the flag, transmitting data collection instructions to the mobile asset.

27. The method of claim 24 wherein the signal of step (d) includes the performance data.

28. The method of claim 24 wherein the mobile asset is a railroad locomotive.

29. For use with a mobile asset comprising a plurality of systems, an on-board monitor for monitoring the performance of the systems, comprising:

a plurality of sensors for collecting performance data relative to at least one locomotive system;

a first memory for storing the performance data;

a threshold module for establishing at least one predetermined performance data range;

a transmitter for attempting to transmit the performance data to a remote site when one or more of the performance data ranges is exceeded; and if none of the performance data ranges are exceeded or if the attempted transmission was unsuccessful, said transmitter transmitting the performance data to the remote site periodically.

30. The on-board monitor of claim 29, wherein the transmitter transmits the performance data to the remote site in response to a polling signal transmitted from the remote site to the on-board monitor.

31. The on-board monitor of claim 29 including:

a second memory for storing one or more triggering conditions, wherein each said triggering condition has associated therewith an instruction for controlling the performance monitoring when the triggering condition is satisfied.

32. The on-board monitor of claim 31 wherein if the instruction is not satisfied data is collected on a first frequency and if the instruction is satisfied, data is collected on a second frequency, wherein said second frequency is greater than said first frequency.

33. The on-board monitor of claim 31 wherein the instruction includes collecting additional performance data from one or more of the locomotive systems.

34. The on-board monitor of claim 31 wherein the instruction includes transmitting the performance data to the remote site.

35. The on-board monitor of claim 29 including:

a global positioning system receiver for determining the geographical location of the locomotive when the performance data is collected; and a module responsive to said global positioning system receiver for tagging the performance data with the geographical location.

36. The on-board monitor of claim 29 including: a global positioning system receiver for determining the current time; and a module responsive to said global positioning receiver for tagging the performance data with the current time.

37. An article of manufacture comprising:

a computer program product comprising a computer-usable medium having a computer-readable code therein for use with a mobile asset comprising a plurality of systems, for monitoring the performance of one or more of the systems, comprising:

(a) a computer-readable program code module for collecting performance data relative to at least one mobile asset system;

(b) a computer-readable program code module for storing the performance data;

(c) a computer-readable program code module for establishing at least one predetermined performance data range;

(d) a computer-readable program code module for attempting to transmit the performance data to a remote site when one or more of the performance data limits is exceeded; and (e) in the event the attempted transmission of step (d) was unsuccessful, or in the event none of the performance data limits are exceeded, a computer-readable program code module for transmitting the performance data to the remote site periodically.

* * * * *